UNITED STATES PATENT OFFICE 2,312,908

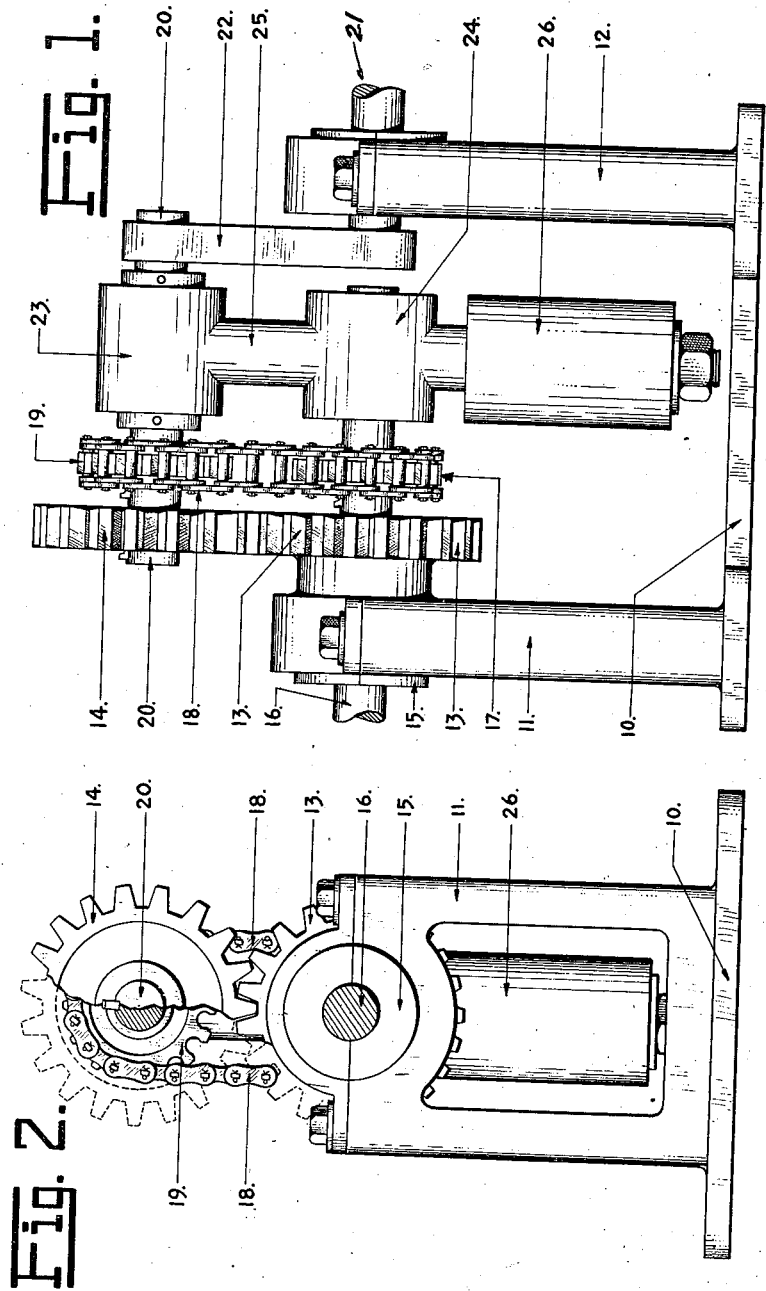

MECHANISM FOR TRANSMITTING POWER

Francisco Roig Ibañez, Mexico City, Mexico

Application November 17, 1941, Serial No. 419,495
In Mexico August 15, 1941

1 Claim. (Cl. 74—306)

The present invention relates to mechanisms or mechanical movements, and more particularly refers to a novel and useful mechanism for transmitting power, the main object intended being, according to the arrangement of this invention, the transmission of power and the possibility of so doing as a lessener of speed, with the advantage that the admission shaft (where the power is applied) and the outlet of power (where the resistance is applied) coincide in the same direction.

The present mechanical arrangement substantially and essentially consists in a motive shaft that operates a pulley or a gear fixed thereto, which in turn transmits the movement to an upper shaft. The upper shaft is provided at its end with a satellite gear that turns around a similar gear fixed to the support of the mechanism; the opposite end of the upper shaft being provided with a connecting rod to transmit the movement of the "planetary system" to the outlet shaft attached to the end of said connecting rod and operating in a bearing fixed to the support for the mechanism.

The main object of the invention is to provide a mechanism for transmitting power with the possibility of use as a reducer of speed and with the considerable advantage that both ends of admission and outlet coincide in the same direction.

The features of the present mechanism will be apparent from the following description as well as from the drawing attached as an illustration, the same reference number indicating the same parts in the figures shown.

In the drawing:

Fig. 1 shows an elevation of the present mechanism.

Fig. 2 is a side view of the same with some parts partially broken away to show rear members.

The present mechanical arrangement comprises a base 10 and supporting structures 11 and 12 located at a proper distance apart. Support 11 holds and maintains fixed a gear or tooth wheel 13, around which a satellite gear 14 turns. The support 11 provides at its upper part a bearing 15 in which the power shaft 16 is mounted, said power shaft 16 extending through and beyond the center of the fixed gear 13. Said power shaft 16 carries a fixed pulley or gear 17 which transmits movement through a chain 18 or the like, to a similar gear or pulley 19 fixed to a shaft 20, hereinafter termed the auxiliary shaft, which shaft 20 carries the satellite gear 14.

The turning motion of the shaft 20 by means of the satellite gear 14 is transmitted to a driven shaft 21 alined with power shaft 16, and driven by means of the connecting rod 22.

On the shaft 20, between the connecting rod 22 and the gear or pulley 19, is attached a bearing 23, preferably ball-bearing, connected to a similar bearing 24 by a bar 25. These bearings 23 and 24 turn freely on shafts 20 and 16, and carry a counterpoise 26 which has the same revolving motion impressed upon it by the satellite gear 14 and the shaft 20, with its center of revolution in the power shaft 16.

Operation of the apparatus:

On being driven by power applied to power shaft 16, the mechanism transmits the motion through the pulley or gear 17 fixed to the said shaft to the similar one fixed in the shaft 20. The satellite gear 14 being also fixed to shaft 20, the revolution of this gear is around the gear 13 fixed to the support 11; this turning motion is transmitted to counterweight 26 through the bar 25 and the bearings 23 and 24 and to the outlet shaft through the connecting rod 22.

It is to be understood that my invention is not limited to the precise construction set forth, but that it includes within its purview whatever changes fairly come within either the terms or the spirit of the appended claim.

Having thus described the invention, what I consider as new and desire to secure by Letters Patent is:

A power transmission, including a power shaft, a driven shaft in axial alignment with the power shaft, a gear fixed against rotation and through which the power shaft extends in coaxial relation, an auxiliary shaft arranged in spaced parallel relation to the power shaft and driven shaft and movable about the power shaft as a center, a gear on one end of the auxiliary shaft in constant mesh with the fixed gear, a connecting rod on the opposite end of the auxiliary shaft and having driving connection with the driven shaft, sprocket wheels on the power shaft and auxiliary shaft, a chain engaging said sprockets to drive the auxiliary shaft in the operation of the power shaft, whereby to compel a planetary movement of the auxiliary shaft through the said gear cooperation and a driving action of the driven shaft through the connecting rod, and a counterbalance for the auxiliary shaft and the parts thereon, said counterbalance including a block having a free rotary bearing on the auxiliary shaft between the sprocket thereon and the connecting rod, a second block having free rotary bearing on the end of the power shaft in line with the first-mentioned block, a rigid connection between the blocks, and a weight rigidly carried by the block on the power shaft and depending therefrom in line with the rigid connection and in parallelism with the connecting rod.

FRANCISCO ROIG IBANEZ.